(12) United States Patent
Jo (10) Patent No.: US 10,241,634 B2
(45) Date of Patent: Mar. 26, 2019

(54) METHOD AND APPARATUS FOR PROCESSING EMAIL IN ELECTRONIC DEVICE

(71) Applicant: Samsung Electronics Co., Ltd., Gyeonggi-do (KR)

(72) Inventor: Kyuho Jo, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 307 days.

(21) Appl. No.: 14/327,104

(22) Filed: Jul. 9, 2014

(65) Prior Publication Data
US 2015/0019996 A1 Jan. 15, 2015

(30) Foreign Application Priority Data
Jul. 9, 2013 (KR) .................. 10-2013-0080025

(51) Int. Cl.
G06F 3/048 (2013.01)
G06F 3/0481 (2013.01)
G06F 3/0482 (2013.01)
G06F 3/0484 (2013.01)
H04L 12/58 (2006.01)
G06F 3/0488 (2013.01)

(52) U.S. Cl.
CPC .......... *G06F 3/0481* (2013.01); *G06F 3/0482* (2013.01); *G06F 3/04842* (2013.01); *G06F 3/04847* (2013.01); *G06F 3/04883* (2013.01); *H04L 51/28* (2013.01); *H04L 51/10* (2013.01)

(58) Field of Classification Search
None
See application file for complete search history.

(56) References Cited

U.S. PATENT DOCUMENTS

2004/0236749 A1* 11/2004 Cortright .......... G06F 17/30607
2009/0228807 A1* 9/2009 Lemay ................ G06Q 10/107
715/752
2012/0256863 A1* 10/2012 Zhang ................ G06F 3/04883
345/173

* cited by examiner

Primary Examiner — Tam T Tran
(74) Attorney, Agent, or Firm — The Farrell Law Firm, P.C.

(57) ABSTRACT

A method and an apparatus are provided for processing an email in an electronic device The method includes displaying an email screen; displaying at least one recipient i in a recipient area of the email screen based on the input order of the at lease one recipient; detecting a gesture in the recipient area; and setting and displaying a recipient type of the at least one recipient, based on the detected gesture.

17 Claims, 11 Drawing Sheets

METHOD AND APPARATUS FOR PROCESSING EMAIL IN ELECTRONIC DEVICE

PRIORITY

This application claims priority under 35 U.S.C. § 119(a) to Korean Patent Application Serial No. 10-2013-0080025, which was filed on Jul. 9, 2013 in the Korean Intellectual Property Office, the entire disclosure of which is incorporated herein by reference.

BACKGROUND OF THE INVENTION

1. Field of the Invention

The present invention relates generally to a method and an apparatus for processing an email in an electronic device and, more particularly, to a method and an apparatus for processing an email which enables a recipient type to be set for the transmission of email.

2. Description of Related Art

Recently, electronic devices such as a smart phone and a tablet PC are commonly used. The electronic device provides various convenient functions such as photographing a picture or a video, playing a music file or a video file, gaming, broadcast receiving, and wireless internet.

In particular, the electronic device can receive, prepare, and transmit an email through a wireless communication. A user can input a recipient according to a recipient type when transmitting the email. The recipient type includes a "to" recipient (hereinafter, TO recipient), a "carbon copy" recipient (hereinafter, CC recipient), and "blind carbon copy" recipient (hereinafter, BCC recipient). Further, one or more email address can be input for each recipient type.

Generally, the recipient may be displayed in each of the TO recipient area, the CC recipient area, and BCC recipient area. Alternatively, the recipient may be displayed only in the TO recipient area, and CC recipient and BCC recipient areas may be displayed only when a user input is generated in one of those areas. In this case, areas for inputting and displaying a recipient are divided according to the recipient type (i.e., TO recipient, CC recipient, and BCC recipient), and as a result, inconveniences are generated because a text area for displaying contents of the email is reduced.

SUMMARY

The present invention has been made to address at least the above mentioned problems and/or disadvantages and to provide at least the advantages described below. Accordingly, an aspect of the present invention is to provide a method and an apparatus for processing an email in an electronic device which does not display recipient types in separate areas of the email, but instead displays all recipient types but in a single recipient area. Another aspect of the present invention is to provide a method and an apparatus for processing an email in an electronic device which enables an easy change of the recipient type of a recipient through a gesture.

In accordance with an aspect of the present invention, a method for processing an email in an electronic device is provided. The method includes displaying an email screen, displaying at least one recipient in a recipient area of the email screen, based on an input order of the at least one recipient, detecting a gesture in the recipient area, and setting and displaying a recipient type of the at least one recipient, based on the detected gesture.

In accordance with another aspect of the present invention, an apparatus for processing an email in an electronic device is provided. The apparatus includes a display unit configured to display an email screen; and a control unit configured to control to display at least one recipient in a recipient area of the email screen, based on an input order of the at least one recipient, to detect a gesture in the recipient area, and to set and display a recipient type of the at least one recipient based on the detected gesture.

BRIEF DESCRIPTION OF THE DRAWINGS

The above and other aspects, features, and advantages of certain embodiment of the present invention will be more apparent from the following description taken in conjunction with the accompanying drawings, in which.

DETAILED DESCRIPTION OF EMBODIMENTS OF THE PRESENT INVENTION

Hereinafter, embodiments of the present invention are described in detail with reference to the accompanying drawings. The same reference symbols are used throughout the drawings to refer to the same or like parts. Detailed descriptions of well-known functions and structures incorporated herein may be omitted to avoid obscuring the subject matter of the invention.

For the same reasons, some components in the accompanying drawings are emphasized, omitted, or schematically illustrated, and the size of each component does not fully reflect the actual size. Therefore, the present invention is not limited to the relative sizes and distances illustrated in the accompanying drawings.

An electronic device according to the present invention may be a mobile communication terminal, smart phone, tablet PC (Personnel Computer), hand-held PC, PMP (Portable Multimedia Player), PDA (Personal Digital Assistant), or notebook PC.

Figure 1:
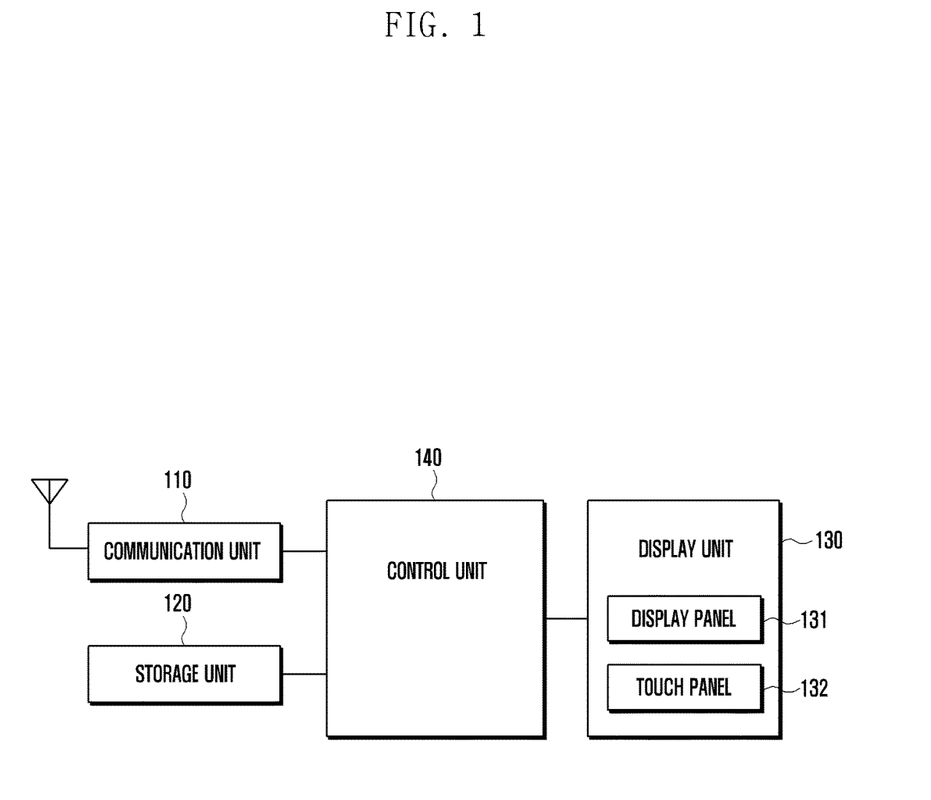
FIG. 1 is a block diagram illustrating a configuration of an electronic device according to an embodiment of the present invention.

FIG. 1 is a block diagram illustrating a configuration of an electronic device according to an embodiment of the present invention.

Referring to FIG. 1, the electronic device according to an embodiment of the present invention includes a communication unit 110, storage unit 120, display unit 130, and control unit 140.

The communication unit 110 performs a voice communication, video communication, or data communication with an external device through a network. The communication unit 110 may be configured with an RF transmitter for up-converting and amplifying the frequency of a transmitting signal, and an RF receiver for low-noise amplifying and down-converting the frequency of a received signal. Further, the communication unit 110 may be configured with an encoder and a decoder. The encoder and decoder may utilize communication systems such as a CDMA, WCDMA, LTE, Wi-Fi, WIBRO, Bluetooth, and NFC. The communication unit 110 may be a mobile communication module, Internet communication module, and/or local area network module.

The storage unit 120 is configured with a program memory for storing an operating program of the electronic device and a data memory for storing data generated while executing a program.

The display unit 130 is configured with a display panel 131 and a touch panel 132 in an integrated form. The display panel 131 displays various screens for the operation of the electronic device under the control of control unit 140. The display panel 131 may be configured with an LCD (Liquid Crystal Display), OLED (Organic Light Emitted Diode), or AMOLED (Active Matrix Organic Light Emitted Diode). The touch panel 132 may be a complex touch panel including a finger touch panel for detecting a finger gesture and a pen touch panel for detecting a pen gesture.

In particular, the display panel 131, according to an embodiment of the present invention, displays an email screen. The touch panel 132 detects an input of a recipient from the email screen, and the display panel 131 displays the input recipient under the control of control unit 140. Further, the touch panel 132 detects a gesture for setting a recipient type in a recipient area of the email screen. Here, the gesture may be a touch and drag gesture. The display panel 131 displays the recipient according to the recipient type under the control of control unit 140.

The control unit 140 controls general operations of the electronic device and signal flows between internal components of the electronic device, performs a data processing function, and controls a power supply from a battery to the components.

When executing an email application, the control unit 140 controls the display panel 131 to display an email screen and to display recipient data input through the touch panel 132 in the recipient area of the email screen. Here, the control unit 140 controls to display the input recipients in the email screen in the order of in which they were input, regardless of the recipient type. The control unit 140 sets the recipient type of the recipients displayed in the recipient area, based on the gesture detected through the touch panel 132. Further, the control unit 140 detects the number of drags in a first direction and/or a second direction when a touch is generated through the touch panel 132. The control unit 140 sets the recipient type based on the detected number of drags in the first direction and/or second direction. The control unit 140 controls to display the recipient by applying a specific effect so that the set recipient types can be distinguished.

In various embodiment of the present invention, a "recipient type" includes a TO recipient, a CC recipient, and a BCC recipient, as described above. A TO recipient refers to an original recipient, namely, a main recipient. A CC recipient and BCC recipient refer to other recipients designated to which an email should be transmitted, besides the main recipient. Recipients of CC and BCC types receive the same email as the main recipient and the recipients of CC type are displayed to the main recipient. However, the recipients of BCC type are not displayed to the main recipient. That is, when transmitting an email to a plurality of recipients, the email is sent to the recipients of BCC type in a state that is hidden from the other recipients.

In various embodiments of the present invention, the term "first recipient type order" is defined as the order of recipient type states which results when a drag in a first direction is detected. The recipient type states change from TO to BCC, then from BCC to CC, and then from CC to TO in response to a drag in the first direction while maintaining a touch for setting the recipient type. Namely, if a drag in the first direction is generated, the recipient type is set in the order of TO→BCC→CC→TO.

The term "second recipient type order" is defined as the order of recipient type states which results when a drag in a second direction is detected. The recipient type states change from TO to CC, then from CC to BCC, and then from BCC to TO in response to a drag in the second direction while maintaining a touch for setting the recipient type. Namely, if a drag in the second direction is generated, the recipient type is set in the order of TO→CC→BCC→TO.

The electronic device may further include selective components having additional functions such as a Global Positioning System (GPS) module for receiving location information, an audio processing unit including a microphone and a speaker, a camera module for photographing a still image and moving image of a subject, and an input unit for supporting an input based on a hard key. However, descriptions and illustrations of these components are omitted here.

Figure 2:
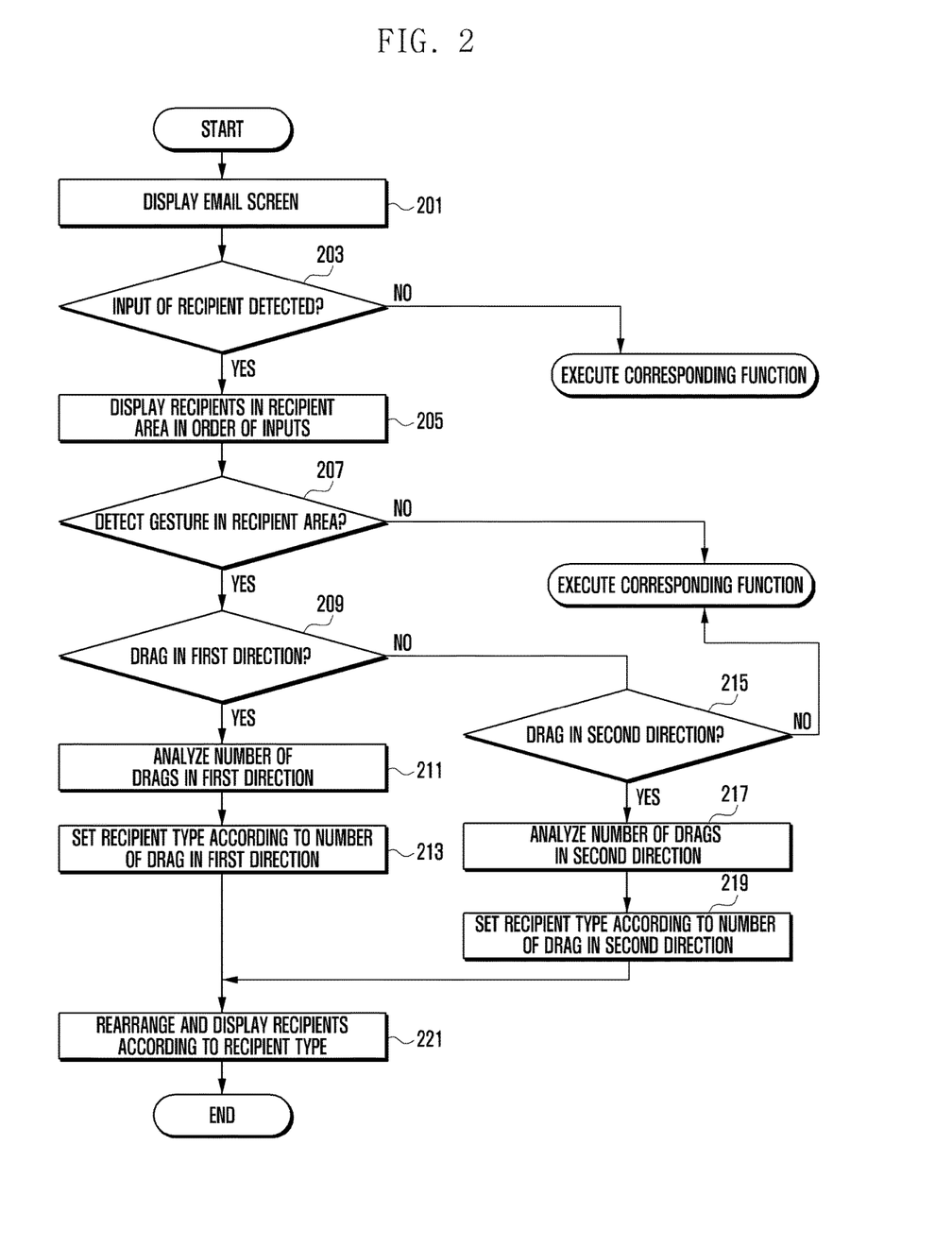
FIG. 2 is a flow chart illustrating a method for setting a recipient type in an email according to various embodiments of the present invention.

FIG. 2 is a flow chart illustrating a method for setting a recipient type in an email according to various embodiments of the present invention. FIGS. 3A to 3H are examples of screens illustrating a method for setting a recipient type in an email according to various embodiments of the present invention.

Figure 3A:
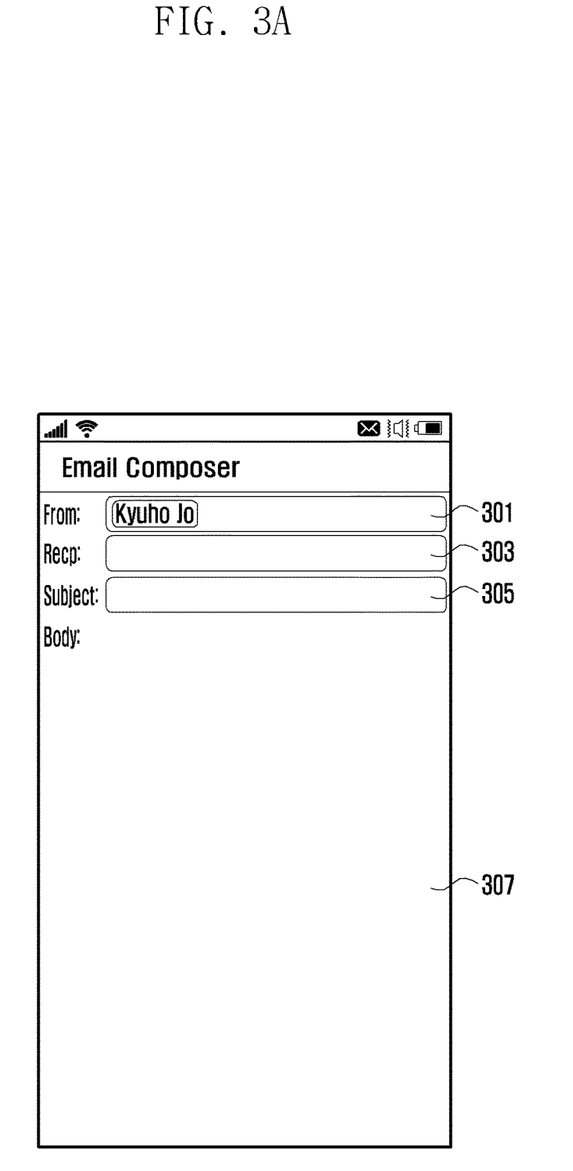
FIGS. 3A to 3H are examples of screens of an electronic device illustrating a method for setting a recipient type in an email according to various embodiments of the present invention.

Referring to FIGS. 2 and 3A to 3H, if an email application is selected in the electronic device, the control unit 140 detects the selection at step 201, and controls the display panel 131 to display a screen for editing an email, as shown in FIG. 3A. The email screen of FIG. 3A is configured with a sender area 301, recipient area 303, subject area 305, and text area 307. The recipient type of recipient input in the recipient area 303 may include a TO recipient (TO), a CC recipient (CC), and BCC recipient (BCC). Conventionally, a method of displaying each recipient type (i.e., TO, CC, and BCC) in its own corresponding areas is generally used when inputting a plurality of recipients. However, in the embodiment of the present invention, the control unit 140 controls to display all recipients in the recipient area 303 in the order in which the recipients are input, and the recipient types of the input recipients may be indicated as a TO recipient, a CC recipient, or a BCC recipient. When the input of recipients is complete or while inputting the recipient, a user can set or change the type of the recipient. Namely, the control unit 140 can set a corresponding recipient type of the recipient by analyzing a user's gesture generated for each recipient. Further, the control unit 140 controls to display a plurality of recipients set with the recipient type in a single recipient area 303.

In the displayed email screen of FIG. 3A, the control unit 140 may detect whether an input of a recipient is generated through the touch panel 132 at step 203. The input of a recipient may be determined based on a touch input generated in the recipient area 303. If the input of a recipient is not generated in the recipient area 303, the control unit 140 may instead perform functions such as editing a text and attaching a document or an image to the email.

If a touch input is generated in the recipient area 303, the control unit 140 may control to display a keypad in the display panel 131 so that a recipient can be input through the keypad. An example of inputting a recipient through the keypad has been described in the embodiment of the present invention, however the present invention is not limited to this and the recipient may be input by executing a contact information application and selecting a recipient from therein. Subsequently, if an input of a recipient is generated, the control unit 140 detects it at step 203, and controls to display the recipient input in the recipient area 303 at step 205. Here, the recipient may include a plurality of persons, and may be displayed in the recipient area 303 in the order in which they were input. Further, the recipient type of the displayed recipient is set by default to TO. In the embodiment of the present invention, the recipient type of recipient is set to the default value of TO, however the present invention is not limited to this and the recipient type of recipient may also be set to CC and/or BCC.

Figure 3B:
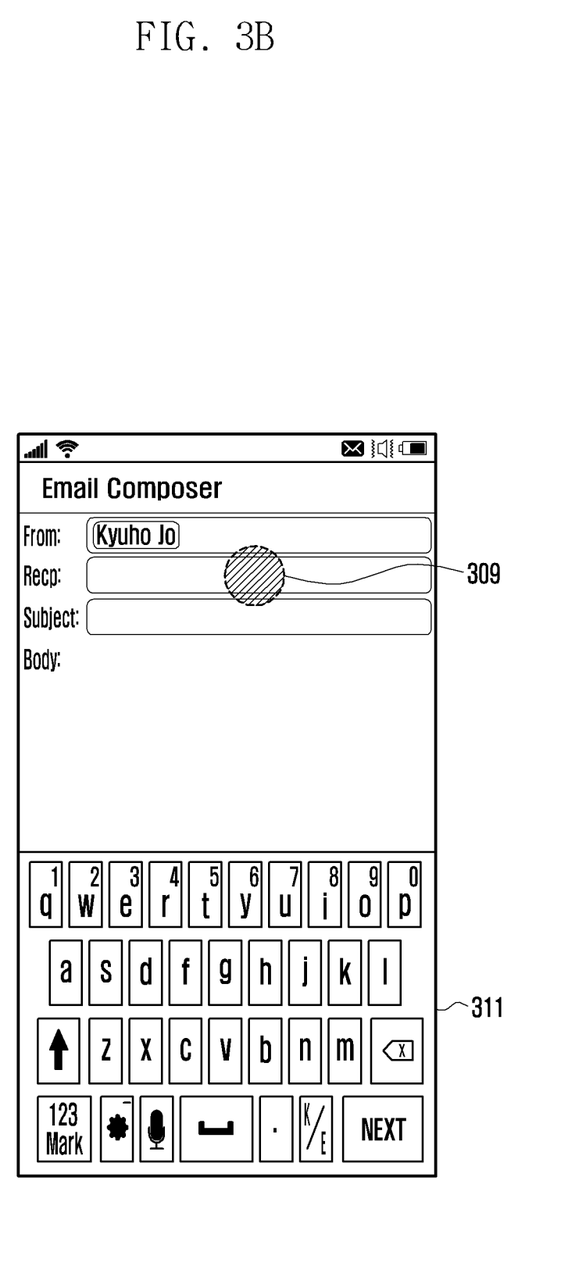
Figure 3C:
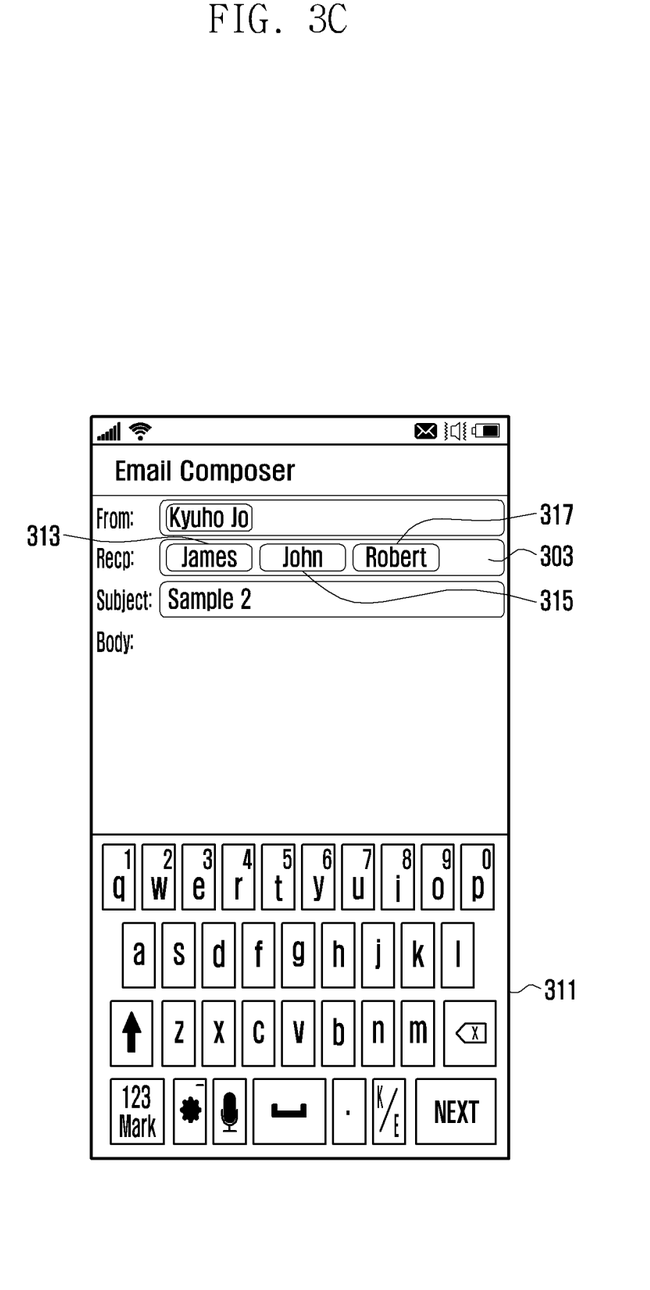

In more detail, if a touch input 309 is generated in the recipient area 303, as shown in FIG. 3B, the control unit 140 displays a keypad 311 in the display panel 131, and receives an input of a recipient through the keypad 311. Referring to FIG. 3C, the control unit 140 displays recipients James 313, John 315, Robert 317, for example, in the recipient area 303 in the order in which the recipients were input. Here, the displayed recipient type of recipient is defaulted to TO. If a gesture is detected, through the touch panel 132, at the recipients which were input in the recipient area 303, the control unit 140 may set the recipient type by changing the recipient type from TO to CC and/or BCC. The method for setting the recipient type by switching using the gesture will be described in reference to steps 209-219.

By using the recipient displayed at step 205, control unit 140 detects a gesture through the touch panel 132 at step 207. The gesture refers to a user input for setting the recipient type of a recipient. In the embodiment of the present invention, the gesture is assumed to be a touch and drag gesture; however the present invention is not limited to this. If the touch and drag gesture is generated, the control unit 140 detects it at step 207, and detects a movement in a specific direction through the touch panel 132 at step 209. In various embodiments of the present invention, the specific direction may be divided into a first direction and a second direction indicating the upward direction and the downward direction, respectively; however, the present invention is not limited to this. The first and second directions may also be the leftward, rightward, or corner directions. If a touch and drag in the first direction (i.e., the upward direction) is generated, the control unit 140 sets the recipient type of a recipient in the first recipient type order. Alternatively, if a touch and drag in the second direction (i.e., the downward direction) is generated, the control unit 140 sets the recipient type of recipient in the second recipient type order.

Next in step 211, the control unit 140 detects and analyzes the number of drags in the state of the touch and drag in the first direction generated through the touch panel 132. Thus, if the touch and drag in the first direction (i.e., the upward direction) is generated, control unit 140 detects and analyzes the number of drags at step 211. The control unit 140 sets the recipient type of a recipient according to the detected number of drags at step 213.

In more detail, if the drag in the first direction is generated 1 time in the state where the recipient type is defaulted to TO while inputting the recipient, the recipient type is switched to BCC. If the drag is generated 2 times, the recipient type is switched to CC. If the drag is generated 3 times, the recipient type returns to the default value TO. Namely, the recipient type of a recipient is switched in the first recipient type order (i.e., TO-BCC-CC) according to the number of drags in the first direction.

Figure 3D:
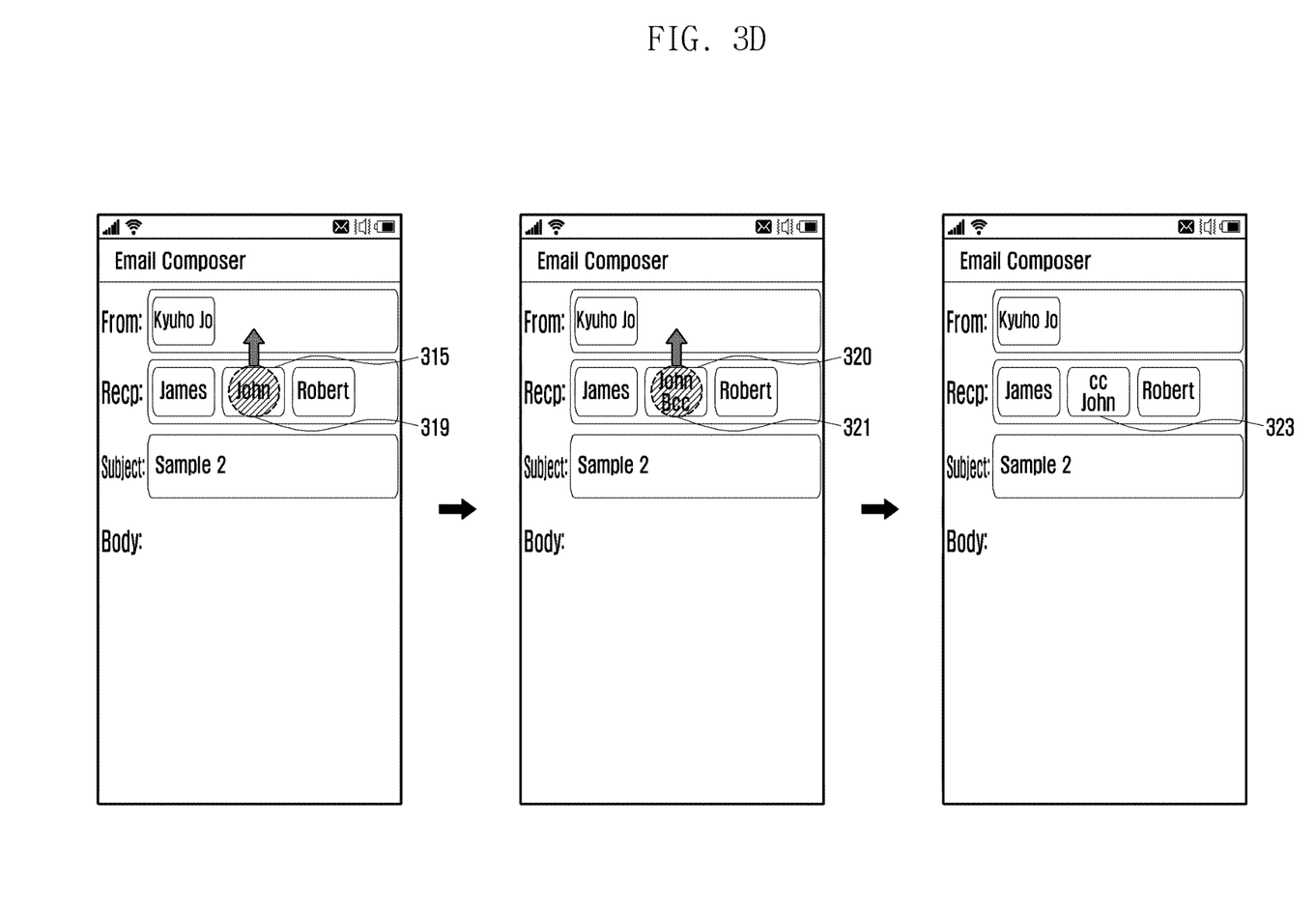

Referring to FIG. 3D, if a touch and a drag 319 in the first direction (i.e. the upward direction) is generated at a recipient John 315 set to the recipient type TO, the control unit 140 changes the recipient type of John 315 to BCC as shown by John BCC 320, and displays a subscript BCC below the name John. If a second touch and drag 321 in the first direction is generated at the recipient John BCC 320 in the state where the recipient type is set to BCC, the control unit 140 changes the recipient type of John BCC 320 to CC, as shown by CC John 323, and displays a superscript CC above the name John.

If the drag in the first direction 319 is not generated at step 209, the control unit 140 identifies whether a drag in the second direction is detected at step 215. If the touch and drag in the second direction (i.e. the downward direction) is generated, the control unit 140 detects the touch and drag at step 215. Then the control unit 140 detects and analyzes the number of drags at step 217. The control unit 140 then sets the recipient type of a recipient according to the detected number of drags at step 219.

In more detail, if the drag in the second direction is generated 1 time in a state where the recipient type is defaulted TO while inputting a recipient, the recipient type is switched to CC. If the drag is generated 2 times, the recipient type is switched to BCC. If the drag is generated 3 times, the recipient type is returns to the default value TO. Namely, the recipient type of a recipient is switched in the second recipient type order (i.e., TO-CC-BCC) according to the number of drags in the second direction.

Figure 3E:
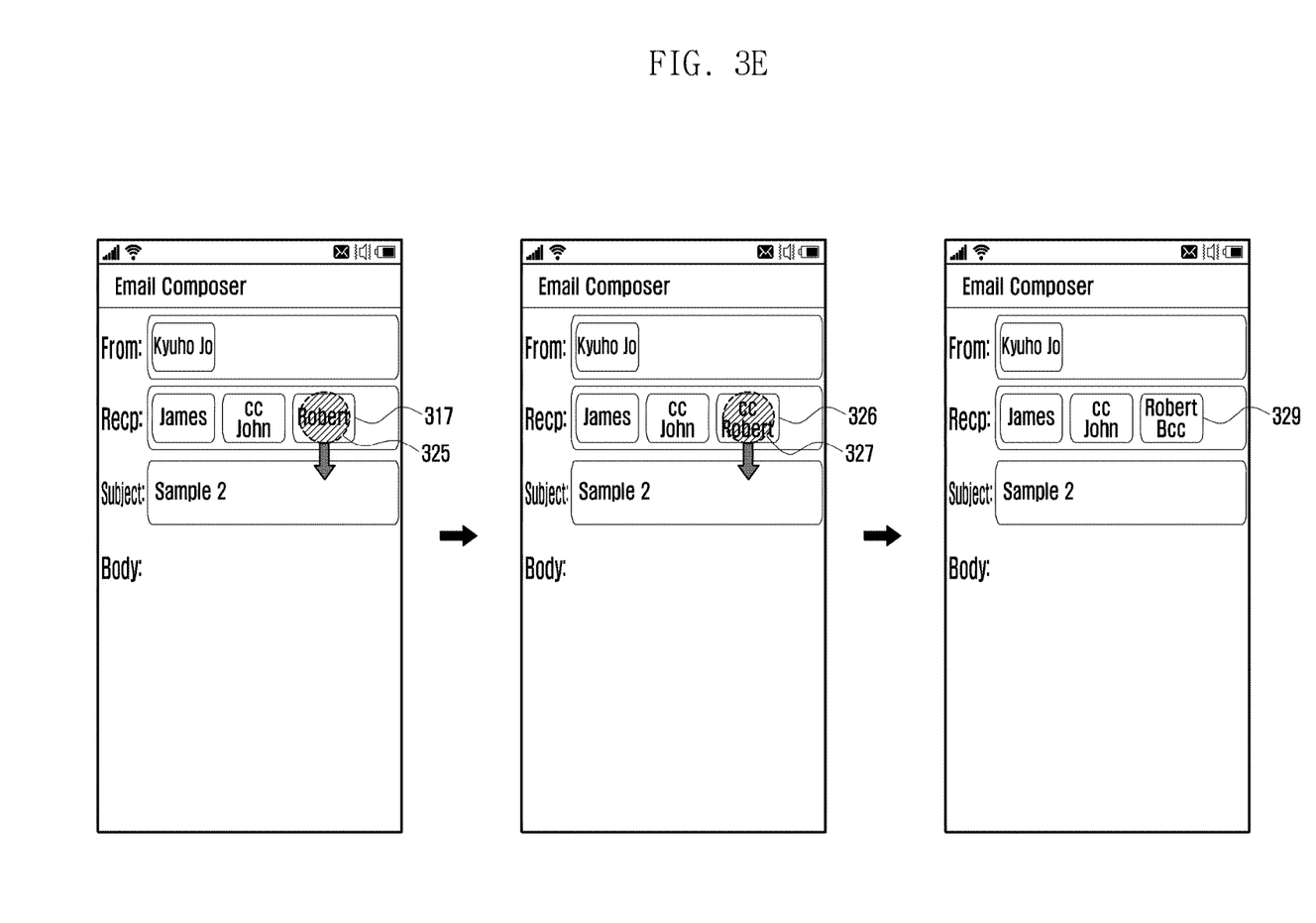

Referring to FIG. 3E, if a touch and a drag 325 in the second direction (i.e. the downward direction) is generated at a recipient Robert 317 set to the recipient type TO, the control unit 140 changes the recipient type of Robert 317 to CC Robert 326, and displays a superscript CC above the name Robert. If a second touch and drag 327 in the second direction is generated at the recipient CC Robert 326 in the state where the recipient type is set to the CC, the control unit 140 changes the recipient type of CC Robert 320 to BCC, as shown by Robert BCC 329, and displays a subscript BCC below the name Robert.

After setting the recipient type, the control unit 140 rearranges and displays the recipients according to the recipient type at step 221. Here, the rearrangement of the recipients refers to arranging the recipients in the order of recipient types (i.e., TO-CC-BCC). In embodiment of the present invention, the rearrangement is assumed to be performed in the order of TO, CC, and BCC, however the present invention is not limited to this. If a plurality of recipients exists, the control unit 140 may rearrange and display the recipients in the order of TO-CC-BCC by grouping recipients having the same recipient type.

Figure 3F:
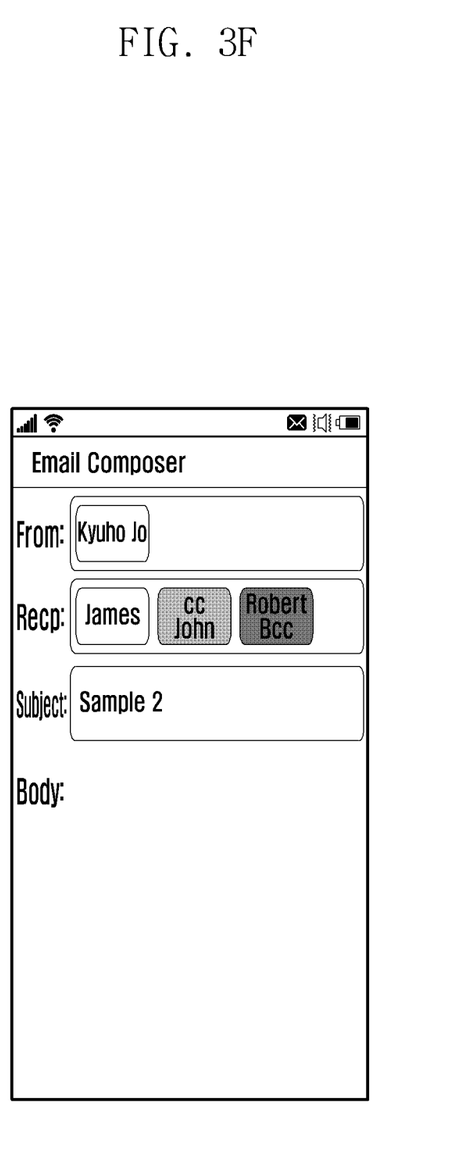

The control unit 140 displays the recipients in the display panel 131 by applying a specific effect so that the recipient types can be distinguished. The method of applying a specific effect includes: displaying a superscript CC above a recipient name if the recipient type is CC, displaying a subscript BCC below the recipient name if the recipient type is BCC, and a displaying the recipients in different colors according to the recipient type as shown in FIG. 3F. By displaying each recipient type with a different effect, a user can easily distinguish the various recipient types.

Figure 3G:
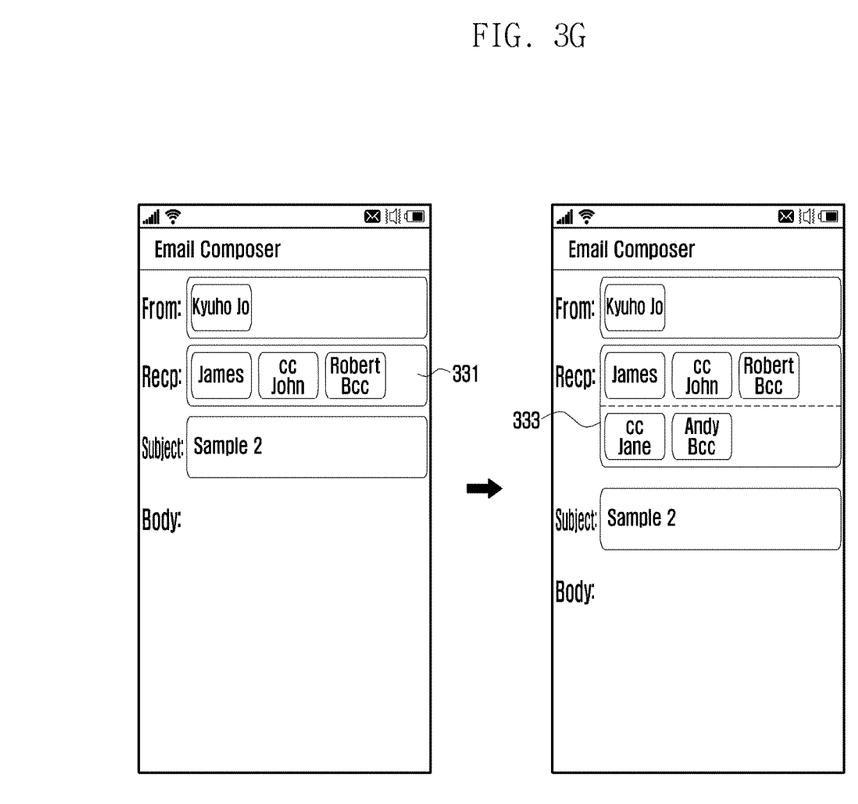

If a plurality of recipients is input, the control unit 140 may add a new line in the recipient area of the email screen. Referring to FIG. 3G, if a fourth recipient is to be input while three recipients are currently displayed (James, John, and Robert) as shown by 331, there is not enough space for displaying the fourth recipient. In this case, the control unit 140 displays the fourth recipient (Jane) and a fifth recipient (Andy) in a newly added line as shown by 333.

Figure 3H:
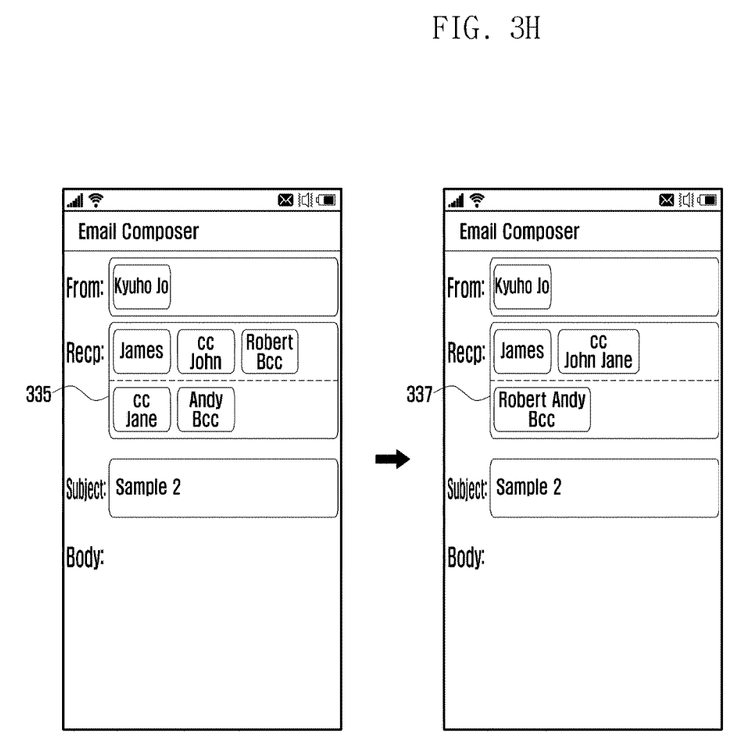

Referring to FIG. 3H, a method of displaying recipients by grouping the recipients having the same recipient type is described. In the state of inputting recipients and setting the recipient types, as shown by 335, the control unit 140 organizes James having a recipient type TO, John and Jane having a recipient type CC, and Robert and Andy having a recipient type BCC, into separate groups based on recipient type, as shown by 337. Further, the grouped recipients may be displayed by rearranging in the order of TO-CC-BCC.

Figure 4:
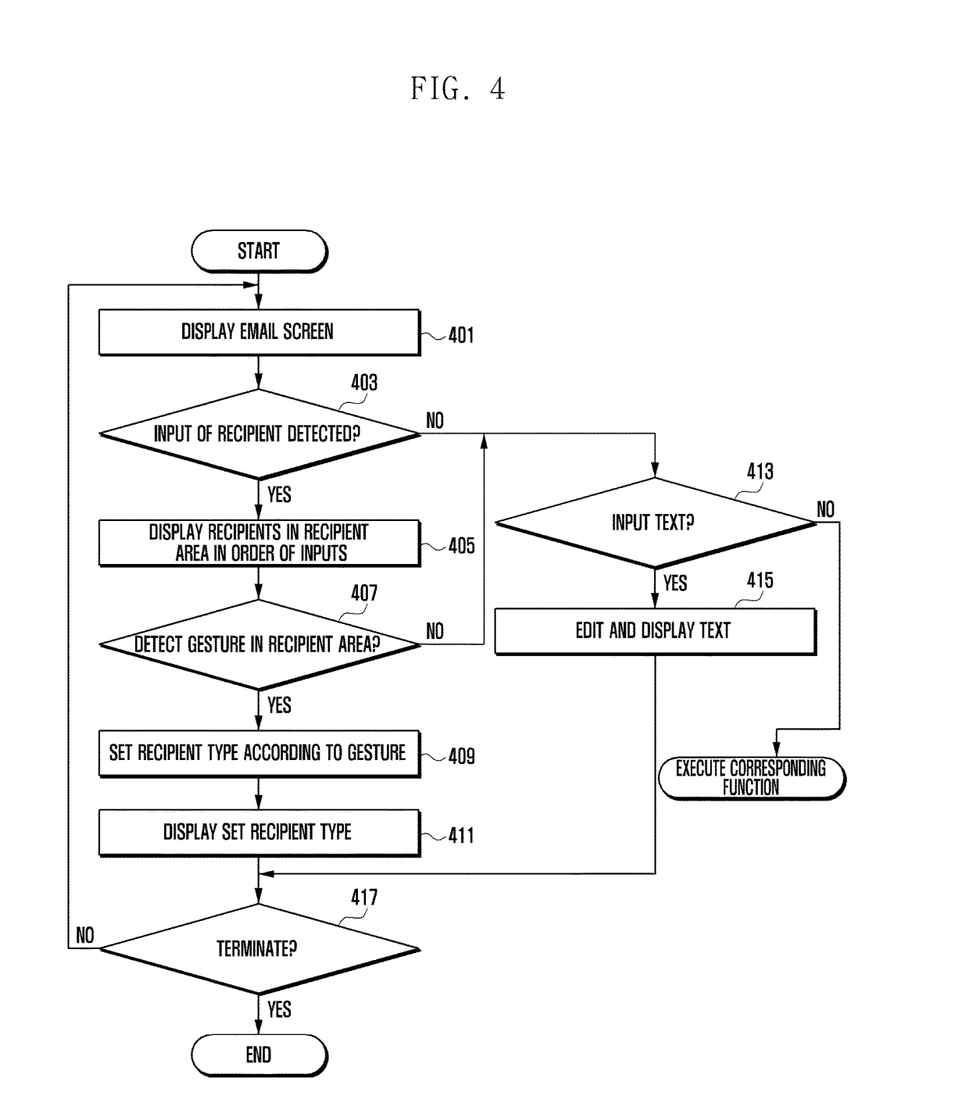
FIG. 4 is a flow chart illustrating a method for editing an email according to various embodiments of the present invention.

FIG. 4 is a flow chart illustrating a method for editing an email according to various embodiments of the present invention.

Referring to FIG. 4, the control unit 140 controls the display panel 131 to display an email edit screen at step 401. In the email edit screen, the control unit 140 detects an input of recipient through the touch panel 132 at step 403. If the input of recipient is generated, the control unit 140 detects it at step 403, and displays the input recipient in the recipient area at step 405. Here, one or more recipients can be input, and the at least one recipient must be set to a recipient type of TO in order to perform an email transmitting function. Further, if a plurality of recipients is input, the recipients may be displayed in the order in which they were input. Here, the recipient type of a recipient is defaulted to TO.

Subsequently, the control unit 140 detects a gesture generated in the displayed recipient area. The gesture refers to a user input for setting the recipient type of a recipient. If the gesture is generated in the recipient area, the control unit 140 detects it as step 407, and sets the recipient type of a recipient based on the gesture at step 409. In the embodiment of the present invention, the gesture is assumed to be a touch and drag gesture, however the present invention is not limited to this. The control unit 140 may detect a touch and a drag in the upward direction or the downward direction generated in the displayed recipient area. In the embodiment of the present invention, the drag is assumed to be in the upward direction or the downward direction. However, the present invention is not limited to this, and the drag may be made in the leftward, rightward, or corner directions. Hereafter, the drag in the upward direction is defined as a first direction drag and the drag in the downward direction is defined as a second direction drag. Here, since step 409 is substantially identical to steps 211 to 213 and steps 217 to 219, the detailed a description thereof is omitted.

If the recipient type of a recipient is set based on the drag in the first direction and/or second direction, the control unit 140 controls to display the recipient with the set recipient type at step 411. For example, a superscript CC is displayed above the recipient if the recipient type is CC and a subscript BCC is displayed below the recipient if the recipient type is BCC. Further, the recipient type may be distinguished by applying a different color, brightness, or pattern. Additionally, the control unit 140 may rearrange and display the recipients according to the recipient type. In various embodiments of the present invention, the rearrangement is assumed to be performed in the order of TO-CC-BCC; however the present invention is not limited to this. If a plurality of recipients is input, the control unit 140 can rearrange and display the recipients by grouping the recipients having the same recipient type.

If an input of recipient is not generated at step 403, the control unit 140 determines whether a touch input is detected in a text area at step 413. If the touch input is detected in the text area, the control unit 140 detects it at step 413, and displays a text editing screen at step 415. If the touch input is not detected in the text area, the control unit 140 may instead perform functions such as attaching a document or an image to the email.

After setting the recipient type of recipient and/or editing the text, the control unit 140 detects a command for terminating the email editing at step 417. Here, the termination of email editing may include a cancellation of the email editing and a transmission of the email. If the command for terminating the email editing is generated, the control unit 140 terminates the email editing.

If the command for terminating the email editing is not generated at step 417, the control unit 140 returns to step 401, and controls the display panel 131 to continue displaying an email screen.

The electronic device according to various embodiments of the present invention displays recipients of a plurality of recipient types in a singe recipient area when inputting the recipients in an email application, and thereby provides an effective method of saving screen space in the electronic device.

Further, the present invention enables a user to easily change the recipient type of a recipient through a gesture in a recipient area, and provides the user with an intuitive method of identifying the recipient type of a recipient by displaying the recipient types in different forms.

Although embodiments of the invention have been described in detail hereinabove, it should be understood that many variations and modifications of the basic inventive concept described herein will still fall within the spirit and scope of the invention as defined in the appended claims and their equivalents.

What is claimed is:

1. A method for processing an email in an electronic device, the method comprising:
   displaying an email screen;
   displaying a recipient in a recipient area of the email screen, based on an input order of the recipient;
   detecting a gesture in the displayed recipient;
   determining a recipient type of the recipient in response to the gesture without moving the recipient;
   displaying the determined recipient type at a location adjacent to the recipient,
   wherein the recipient type of the recipient is determined in a predetermined recipient type order based on a moving direction of the gesture; and
   wherein displaying the determined recipient type further comprises:
   changing the recipient type of the recipient, based on a number of drags in the detected gesture,
   wherein changing the recipient type of the recipient comprises:
   changing the recipient type of the recipient in an order of BCC type, CC type, TO type, based on the number of drags in the gesture in a first direction, and
   changing the recipient type of the recipient in the order of CC type, BCC type, TO type, based on the number of drags in the gesture in a second direction.

2. The method of claim 1, wherein the email screen includes a text area, and when an input is detected in the text area, the email screen displays a text in the text area.

3. The method of claim 1, wherein the gesture is a touch and drag gesture.

4. The method of claim 3, wherein determining the recipient type determines the recipient type of the recipient to be a TO type.

5. The method of claim 4, wherein determining the recipient type further comprises:
   determining the recipient type of the recipient to be a BCC type, when the detected gesture is performed in the first direction; and determining the recipient type of the recipient to be a CC type, when the detected gesture is performed in the second direction.

6. The method of claim 5, wherein the gesture in the first direction is the drag performed in an upward direction from a location of the touch and the gesture in the second direction is the drag performed in a downward direction from the location of touch.

7. The method of claim 5, wherein displaying the determined recipient type further comprises:
rearranging and displaying a plurality of recipients in the recipient area if the plurality of recipients are displayed in the recipient area,
wherein rearranging and displaying the plurality of recipients arranges the plurality of recipients in the recipient area, based on the recipient type of the plurality of recipients, in the order of TO type, CC type, BCC type, and displays the plurality of recipients with an effect which distinguishes each reception type.

8. The method of claim 7, wherein displaying the determined recipient type further comprises when a plurality of recipients is input with a same recipient type, displaying the plurality of recipients grouped by recipient type.

9. The method of claim 8, wherein the effect includes at least one of an uppercase, lowercase, color, brightness, and pattern.

10. An apparatus for processing an email in an electronic device, the apparatus comprising:
a display configured to display an email screen; and
a processor configured to:
display a recipient in a recipient area of the email screen, based on an input order of the recipient;
detect a gesture in the displayed recipient, to determine a recipient type of the recipient in response to the gesture without moving the recipient;
display the determined recipient type at a location adjacent to the recipient;
determine the recipient type of the recipient is determined in a predetermined recipient type order based on a moving direction of the gesture; and
wherein the processor is further configured to:
change the recipient type of the recipient, based on a number of drags in the detected gesture;
change the recipient type of the recipient in an order of BCC type, CC type, TO type, based on the number of drags in the gesture in a first direction; and
change the recipient type of the recipient in an order of CC type, BCC type, TO type, based on the number of drags in the gesture in a second direction.

11. The apparatus of claim 10, wherein the processor is further configured to display a text area in the email screen, and to display a text in the text area when an input is detected in the text area.

12. The apparatus of claim 10, wherein the gesture is a touch and drag gesture.

13. The apparatus of claim 12, wherein the processor is further configured to determine the recipient type of the recipient to be a TO type.

14. The apparatus of claim 13, wherein the processor is further configured to:
determine the recipient type of the recipient to be a BCC type, when the detected gesture is performed in the first direction; and
determine the recipient type of the recipient to be a CC type, when the detected gesture is performed in the second direction.

15. The apparatus of claim 14, wherein the gesture in the first direction is the drag performed in an upward direction from a location of the touch, and the gesture in the second direction is the drag performed in a downward direction from the location of touch.

16. The apparatus of claim 15, wherein the processor is further configured to:
arrange a plurality of recipients in the recipient area, based on the recipient type of the plurality of recipients if the plurality of recipients are displayed in the recipient area, in an order of TO type, CC type, BCC type; and
display the plurality of recipients with an effect which distinguishes each reception type,
wherein the effect includes at least one of an uppercase, lowercase, color, brightness, and pattern.

17. The apparatus of claim 16, wherein the processor is further configured to display the plurality of recipients grouped by recipient type when a plurality of recipients is input with a same recipient type.

* * * * *